Figure 1:
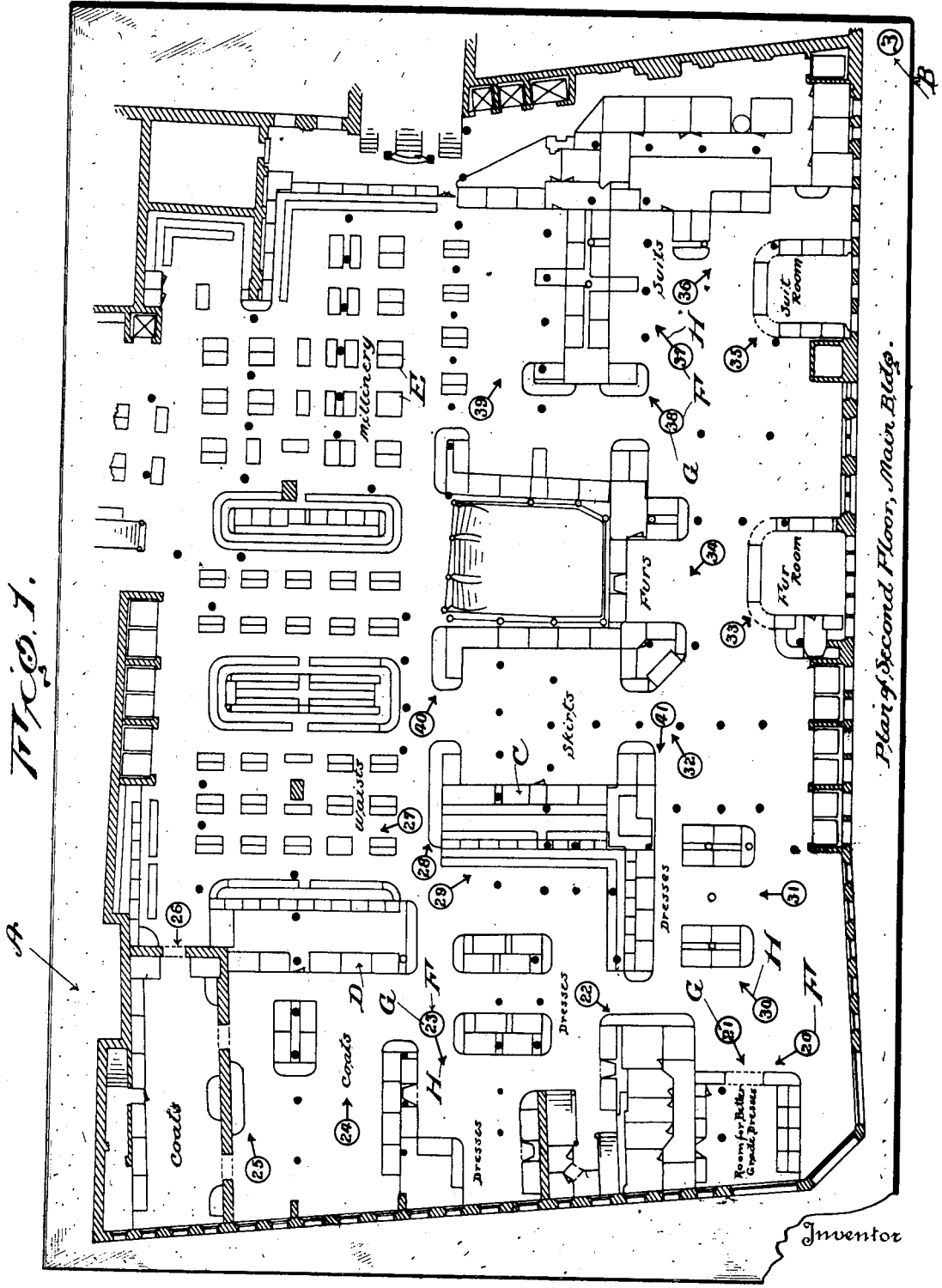

W. T. HORMES.
MEANS OF ILLUSTRATING INSTALLATIONS OF MERCANTILE EQUIPMENT AND THE LIKE.
APPLICATION FILED JULY 13, 1920.

1,404,613.

Patented Jan. 24, 1922.

2 SHEETS—SHEET 2.

20. Plan No. 3. Entrance to room for better grade dresses.

21. Plan No. 3. Entrance to room for better grade dresses.

Inventor
William T. Hormes
By Wm. D. Hodges
Attorney

UNITED STATES PATENT OFFICE.

WILLIAM T. HORMES, OF GOVANS, MARYLAND, ASSIGNOR TO SOLOMON HIMMEL, OF BALTIMORE, MARYLAND.

MEANS OF ILLUSTRATING INSTALLATIONS OF MERCANTILE EQUIPMENT AND THE LIKE.

1,404,613.         Specification of Letters Patent.     Patented Jan. 24, 1922.

Application filed July 13, 1920. Serial No. 395,984.

*To all whom it may concern:*

Be it known that I, WILLIAM T. HORMES, a citizen of the United States, residing at Govans, in the county of Baltimore and State of Maryland, have invented a new and useful Means of Illustrating Installations of Mercantile Equipment and the like, of which the following is a specification.

This invention is a means by which the esthetic and artistic effect of different portions of installations of mercantile equipment, domestic furniture and the like in stores, dwellings, etc., as well as the details of the general lay-out, and the effective and advantageous utilization of space, may be adequately portrayed.

In laying out the plans for the shelving, show cases, etc., of a store equipment, or the arrangement of furniture in the rooms of a dwelling, and other similar installations, it has heretofore been the practice to illustrate the desired arrangement, by a diagrammatic ground plan drawing or chart. This method is unsatisfactory because the average customer is unable to visualize a perspective, when he has before him only a floor plan or an elevation. Sometimes the services of an artist are utilized to make pen or color illustrations, but these are not only expensive, but often are lacking in detail. The salesman or decorator, in endeavoring to disclose to a prospective customer the character of the previous installations, is handicapped because he has no means of illustrating, except by this crude method, the design, arrangement and artistic effect of such previous installations. One of the objects of the invention is to correlate the items of a floor plan with perspective views, and means for indicating the perspective appearance from various positions, by providing a chart illustratng the floor plan arrangement of a store room, or other space, and the disposition of the various elements of equipment or furniture, and to combine with said chart, a series of photographs of the interior represented by the chart, the position of the camera and the direction in which it was facing when each photograph was taken, being indicated on the chart. A further object is to provide the chart and the photographs with correlated indicia by which they may be identified with each other.

The invention will be hereinafter fully set forth and particularly pointed out in the claims.

In the accompanying drawings:—

Figure 2:
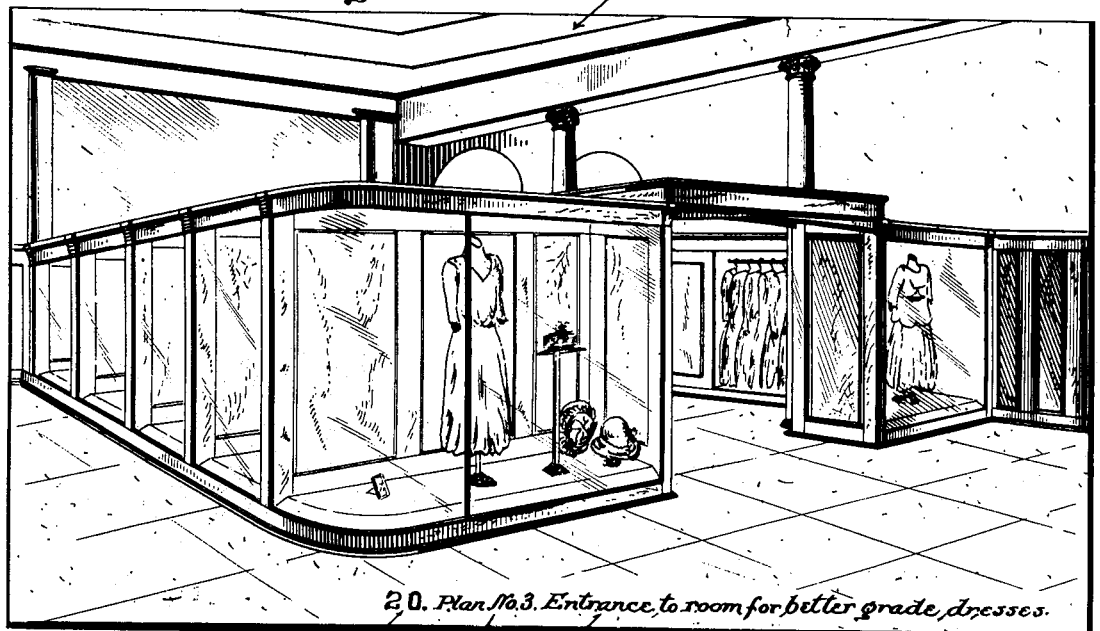
Figure 3:
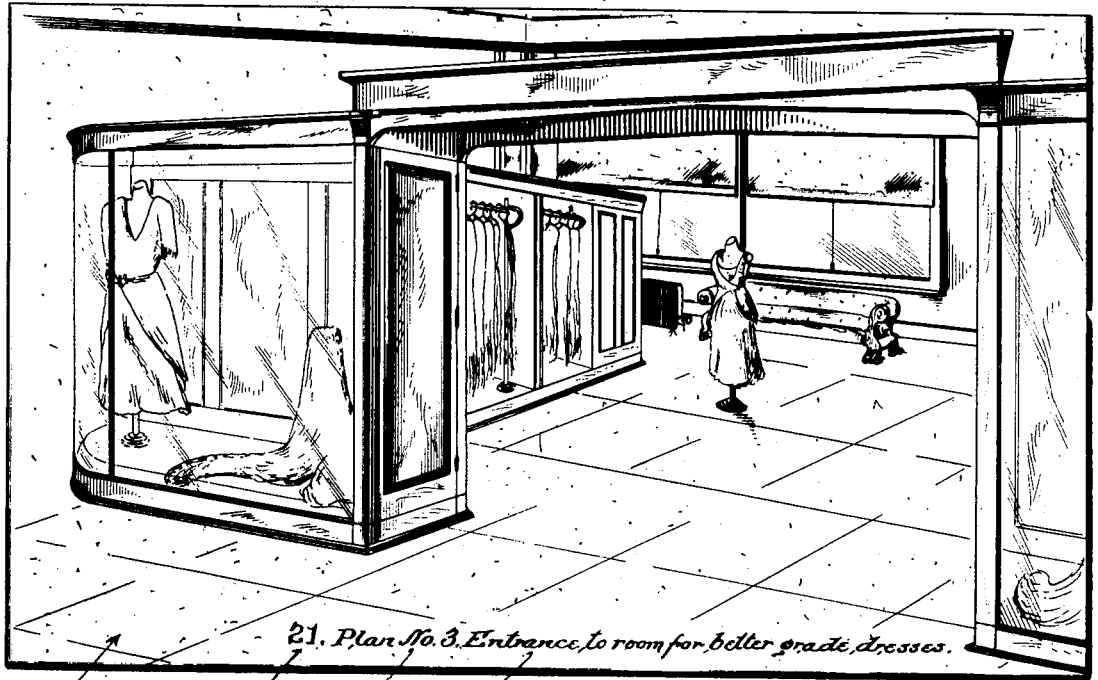

Figure 1 is a view of a ground plan chart, illustrating an installation of shelving, show cases and interior equipment of a department store. Figures 2 and 3 are views illustrating photographs of different parts of the installations illustrated in the chart of Figure 1.

Referring to the drawings, A designates a chart which for purposes of illustration, represents in ground plan, one of the floors of a department store. Said chart bearing an index number B, and containing diagrammatic illustrations of different arrangements of show cases, shelving, display tables, and stands, indicated at C, D, and E, respectively. At different points on the chart A are indicated index spaces F, each provided with a key number G, and an arrow or other indicating means H. Each one of the spaces F indicates a point from which a photograph of the installation illustrated in the chart A has been taken, and the indicating line H, designates the direction in which the camera was pointing at the time that the photograph was taken from that location. Any number of such photographs may be taken and assembled in any desired manner, and any number of charts A of different floors or rooms may be assembled, each bearing a different index number B. In the drawing, two of such photographs are illustrated, designated respectively I and J, and but one chart is shown. Both photographs contain a key number B', indicating that the photograph belongs to the installation illustrated in the chart carrying the same key number. The designation of the number "3" of the plan A, and the words "Plan No. 3" on the photographs I and J, indicate that the photographs are taken from points indicated on plan No. 3.

Each photograph is also provided with a key number G' which number corresponds with one of the numbers G on the plan A. For instance, the number "21" on photograph J, indicates that the photograph was taken from the space F, bearing the number "21," and that the camera pointed in the direction indicated by the arrow H, co-operating with that number. If desired the photographs may contain legends K descriptive of the subject of the photographs.

From the foregoing, it will be readily understood that by means of the photographs and the chart with the correlated key indicia, one is not only enabled to get a graphic idea of the general lay-out illustrated in the ground plan chart A, but by means of the photographs I and J he will obtain a very impressive illustration of the actual appearance of different parts of the same installation. This is a great help in developing ideas for the designing and laying out of store equipment, house furnishings, and the like, and particularly in portraying just how space may be utilized to advantage and without destroying artistic and pleasing effects.

It is to be understood that although the invention has been specifically illustrated and described as particularly applicable to mercantile installations, it is not limited thereto, but is broad enough to comprehend any other type of installation, coming within the terms of the appended claims.

Having thus explained the nature of the invention and described an operative manner of constructing and using the same, although without attempting to set forth all of the forms in which it may be made, or all of the forms of its use, what is claimed is:—

1. Means for illustrating installations of mercantile equipment, domestic furniture and the like, comprising a chart containing representations of the space and of the equipment to be illustrated, one or more reproductions of portions of the actual installation represented on the chart, and means indicating the positions from which the reproductions are viewed, direction of, and the locations of the views with respect to said positions.

2. Means for illustrating installation of store equipment, domestic furniture and the like comprising a chart representing the space and equipment to be illustrated, one or more photographs of actual installation represented on the chart, key numbers on the photographs, corresponding key numbers on the chart indicating locations of the camera when the photographs were taken, and means associated with the key number of the chart indicating the direction in which the camera was facing at the time each photograph was taken.

3. Means for illustrating installations of store equipment, domestic furniture and the like, comprising a chart containing representations of the space and equipment to be illustrated, one or more photographs of the actual installations represented on the chart, spaces on the chart indicating different positions from which the photographs have been taken, correlated key numbers on the photographs and on said spaces, and means co-operating with said spaces to indicate direction.

4. Means for illustrating installations of store equipment, domestic furniture and the like, comprising a chart containing representations of the space and equipment to be illustrated, one or more photographs of the actual installations represented on the chart, spaces on the chart indicating different positions from which the photographs have been taken, correlated key numbers on the photographs and on said spaces, means co-operating with said spaces to indicate direction, and complemental indicia on the photographs and the chart identifying the photographs with the particular chart.

In testimony whereof I have hereunto set my hand.

WILLIAM T. HORMES.